(12) United States Patent
Wang et al.

(10) Patent No.: US 11,796,055 B2
(45) Date of Patent: Oct. 24, 2023

(54) MONITORING METHOD AND DEVICE FOR DETERMINATION OF GEAR-STICK POSITION, VEHICLE CONTROLLER, AND VEHICLE

(71) Applicant: GREAT WALL MOTOR COMPANY LIMITED, Hebei (CN)

(72) Inventors: Shaokai Wang, Baoding (CN); Gang Yan, Baoding (CN)

(73) Assignee: GREAT WALL MOTOR COMPANY LIMITED, Hebei (CN)

( * ) Notice: Subject to any disclaimer, the term of this patent is extended or adjusted under 35 U.S.C. 154(b) by 0 days.

(21) Appl. No.: 17/765,573

(22) PCT Filed: Dec. 11, 2020

(86) PCT No.: PCT/CN2020/135743
§ 371 (c)(1),
(2) Date: Jul. 20, 2022

(87) PCT Pub. No.: WO2021/129420
PCT Pub. Date: Jul. 1, 2021

(65) Prior Publication Data
US 2023/0160468 A1  May 25, 2023

(30) Foreign Application Priority Data
Dec. 27, 2019  (CN) .......................... 201911378102.6

(51) Int. Cl.
*F16H 61/12* (2010.01)
*F16H 59/04* (2006.01)
*F16H 59/70* (2006.01)

(52) U.S. Cl.
CPC .......... *F16H 61/12* (2013.01); *F16H 59/044* (2013.01); *F16H 59/70* (2013.01); *F16H 2059/706* (2013.01); *F16H 2061/1208* (2013.01)

(58) Field of Classification Search
CPC .. F16H 59/044; F16H 59/70; F16H 2059/706; F16H 61/12; F16H 2061/1208
See application file for complete search history.

(56) References Cited

U.S. PATENT DOCUMENTS 5,007,299 A * 4/1991 Bulgrien ................. F16H 63/46
74/335
5,035,113 A * 7/1991 Simonyi ............. F16H 63/3023
74/473.11

(Continued)

FOREIGN PATENT DOCUMENTS

| CN | 1710304 A | 12/2005 |
|---|---|---|
| CN | 101504270 A | 8/2009 |

(Continued)

OTHER PUBLICATIONS

International Application No. PCT/CN2020/135743 International Search Report and Written Opinion with English Machine Translation dated Mar. 10, 2021, 10 pgs.

*Primary Examiner* — Edwin A Young
(74) *Attorney, Agent, or Firm* — Fredrikson & Byron, P.A.

(57) ABSTRACT

A monitoring method and device for determination of a gear-stick position, a vehicle control unit, and a vehicle. The monitoring method for determination of a gear-stick position includes: acquiring a first actual gear-stick position and a first acceptable gear-stick position calculated by a functional layer; calculating a second actual gear-stick position according to a gear-stick position signal; determining whether the first actual gear-stick position and the second actual gear- (Continued)

stick position are consistent; in case that the first actual gear-stick position and the second actual gear-stick position are consistent, determining whether the first acceptable gear-stick position is valid; and in case that the first actual gear-stick position and the second actual gear-stick position are inconsistent or the first acceptable gear-stick position is invalid, controlling the vehicle to enter a safe state. The present application can ensure safe driving of a vehicle.

12 Claims, 2 Drawing Sheets

(56) References Cited

U.S. PATENT DOCUMENTS

| | | | |
|---|---|---|---|
| 2014/0129102 A1* | 5/2014 | Wagoner | F16H 61/12 701/64 |
| 2019/0219162 A1 | 7/2019 | Ahlstrm | |

FOREIGN PATENT DOCUMENTS

| | | | |
|---|---|---|---|
| CN | 103802831 | A | 5/2014 |
| CN | 106499812 | A | 3/2017 |
| CN | 107269826 | A | 10/2017 |
| CN | 107599891 | A | 1/2018 |
| CN | 107676475 | A | 2/2018 |
| CN | 108128156 | A | 6/2018 |
| CN | 108386533 | A | 8/2018 |
| CN | 109458454 | A | 3/2019 |
| EP | 2003373 | A1 | 12/2008 |
| JP | 10110633 | A | 4/1998 |
| JP | 2001163198 | A | 6/2001 |
| JP | 2005133858 | A | 5/2005 |
| JP | 2007024136 | A | 2/2007 |
| JP | 2013224693 | A | 10/2013 |
| JP | 2015017645 | A | 1/2015 |
| JP | 2016109292 | A | 6/2016 |
| JP | 2018096528 | A | 6/2018 |
| JP | 2018115695 | A | 7/2018 |
| RU | 2180716 | C2 | 3/2002 |
| RU | 2241610 | C1 | 12/2004 |

* cited by examiner

MONITORING METHOD AND DEVICE FOR DETERMINATION OF GEAR-STICK POSITION, VEHICLE CONTROLLER, AND VEHICLE

CROSS-REFERENCE TO RELATED APPLICATIONS

This application is a 35 U.S.C. § 371 national stage application of PCT Application Ser. No. PCT/CN2020/135743 filed on Dec. 11, 2020, which claims the benefit of Chinese Patent Application No. 2011911378102.6 filed on Dec. 27, 2019, the contents of which are incorporated herein by reference.

TECHNICAL FIELD

The present application relates to the field of vehicle technology, and in particular, to a monitoring method and device for determination of a gear-stick position, a vehicle controller, and a vehicle.

BACKGROUND

At present, the vehicle controller for a pure electric vehicle as a control brain of the whole vehicle is closely related to the functions of the whole vehicle. Different from the traditional fuel vehicle, the functions of which are completed by a transmission controller, the determination of the gear-stick position of the pure electric vehicle is calculated by the vehicle controller. The functional layer of the vehicle controller determines, according to a gear signal, an actual gear-stick position and an acceptable gear-stick position selected by a driver, and executes a torque request according to the consistency between the actual gear-stick position and the acceptable gear-stick position.

If the acceptable gear-stick position and a to-be-shifted gear-stick position calculated by the functional layer of the vehicle controller are wrong or invalid, serious harm may be brought to the operations of the whole vehicle. In related technologies, there is a lack of corresponding monitoring strategies for the to-be-shifted gear-stick position and the acceptable gear-stick position calculated by the functional layer of the vehicle controller.

SUMMARY

In view of this, an objective of the present application is to provide a monitoring method for determination of a gear-stick position, aiming to solve the defect in the existing technologies that no corresponding monitoring strategies is provided for the to-be-shifted gear-stick position and the acceptable gear-stick position calculated by the functional layer of the vehicle controller.

To achieve the above objective, technical solutions of the present application may be implemented as follows:

A monitoring method for determination of a gear-stick position is provided. The monitoring method for determination of the gear-stick position includes the following steps: obtaining a first actual gear-stick position and a first acceptable gear-stick position calculated by a functional layer; calculating a second actual gear-stick position according to a gear-stick position signal; determining whether the first actual gear-stick position and the second actual gear-stick position are consistent; determining whether the first acceptable gear-stick position is valid in case that the first actual gear-stick position and the second actual gear-stick position are consistent; and controlling a vehicle to enter a safe state in case that the first actual gear-stick position and the second actual gear-stick position are inconsistent, or the first acceptable gear-stick position is invalid.

Further, the step of controlling a vehicle to enter a safe state includes determining whether a current speed of the vehicle is greater than a first threshold. In case that the current speed of the vehicle is greater than the first threshold, the vehicle is controlled to remain driving at the acceptable gear-stick position currently being executed, and a limit torque is set for the acceptable gear-stick position currently being executed; and in case that the current speed of the vehicle is smaller than or equal to the first threshold, the vehicle is controlled to travel in neutral gear.

Further, the gear-stick position signal includes a positive gear-stick position signal and a negative gear-stick position signal, the step of calculating a second actual gear-stick position according to a gear-stick position signal includes determining whether the positive gear-stick position signal and the negative gear-stick position signal are consistent. The monitoring method for determination of a gear-stick position also includes controlling the vehicle to enter the safe state in case that the positive gear-stick position signal and the negative gear-stick position signal are inconsistent.

Further, the step of determining whether the first acceptable gear-stick position is valid includes the following steps: determining whether the acceptable gear-stick position currently being executed can be shifted to the first acceptable gear-stick position in case that the first actual gear-stick position and the first acceptable gear-stick position are consistent; and in case of determining that the acceptable gear-stick position currently being executed cannot be shifted to the first acceptable gear-stick position, then it is determined that the first acceptable gear-stick position is invalid. The steps also include determining whether the acceptable gear-stick position currently being executed can be shifted to the first actual gear-stick position in case that the first actual gear-stick position and the first acceptable gear-stick position are inconsistent; and in case of determining that the acceptable gear-stick position currently being executed can be shifted to the first actual gear-stick position, it is determined that the first acceptable gear-stick position is invalid.

Compared to the existing technologies, the monitoring method for determination of a gear-stick position described in the present application has the following advantages:

The monitoring method for determination of a gear-stick position described in the present application can monitor the first actual gear-stick position and the first acceptable gear-stick position calculated by the functional layer, and in case that the first actual gear-stick position calculated by the functional layer and the second gear-stick position calculated by itself are inconsistent, or the first acceptable gear-stick position is invalid, the vehicle is controlled to enter the safe state, such that the safe driving of the whole vehicle can be ensured.

Another objective of the present application is to provide a monitoring device for determination of a gear-stick position, so as to solve the defect in the existing technologies that no corresponding monitoring strategies is provided for the to-be-shifted gear-stick position and the acceptable gear-stick position calculated by the functional layer of the vehicle controller.

To achieve the above objective, the technical solutions of the present application may be implemented as follows:

A monitoring device for determination of a gear-stick position is provided. The monitoring device for determination of a gear-stick position includes: an acquisition module, a calculation module, a first determination module, a second determination module, and a control module. The acquisition module is configured to acquire a first actual gear-stick position and a first acceptable gear-stick position calculated by a functional layer. The calculation module is configured to calculate a second actual gear-stick position according to a gear-stick position signal. The first determination module is configured to determine whether the first actual gear-stick position and the second actual gear-stick position are consistent. The second determination module is configured to determine, in case that the first actual gear-stick position and the second actual gear-stick position are consistent, whether the first acceptable gear-stick position is valid. The control module is configured to control, in case that the first actual gear-stick position and the second actual gear-stick position are inconsistent, or the first acceptable gear-stick position is invalid, a vehicle to enter a safe state.

Further, the control module is configured to control the vehicle to enter the safe state according to the following operations that include: determining whether a current speed of the vehicle is greater than a first threshold; in case that the current speed is greater than the first threshold, controlling the vehicle to remain driving at the acceptable gear-stick position currently being executed, and setting a limit torque for the acceptable gear-stick position currently being executed; and in case that the current speed is lesser than or equal to the first threshold, controlling the vehicle to travel in neutral gear.

Further, the gear-stick position signal includes a positive gear-stick position signal and a negative gear-stick position signal. The calculation module is configured to calculate the second actual gear-stick position according to the gear lever position signal based on the following operations that include: determining whether the positive gear-stick position signal and the negative gear-stick position signal are consistent; and in case that the positive gear-stick position signal and the negative gear-stick position signal are consistent, calculating the second actual gear-stick position. The control module is also configured to control, in case that the positive gear-stick position signal and the negative gear-stick position signal are inconsistent, the vehicle to enter the safe state.

Further, the second determination module is configured to determine whether the first acceptable gear-stick position is valid according to the following operations that include: in case that the first actual gear-stick position and the first acceptable gear-stick position are consistent, performing the following operations: determining whether the acceptable gear-stick position currently being executed can be shifted to the first acceptable gear-stick position; and in case of determining that the acceptable gear-stick position currently being executed cannot be shifted to the first acceptable gear-stick position, then it is determined that the first acceptable gear-stick position is invalid. in case that the first actual gear-stick position and the first acceptable gear-stick position are inconsistent, the operations also includes: determining whether the acceptable gear-stick position currently being executed can be shifted to the first actual gear-stick position; and in case of determining that the acceptable gear-stick position currently being executed can be shifted to the first actual gear-stick position, then it is determined that the first acceptable gear-stick position is invalid.

The monitoring device for determination of a gear-stick position and the above-described monitoring method for determination of a gear-stick position have the same advantages over the existing technologies, which will not be repeated herein.

Accordingly, in accordance with an embodiment of the present application, a vehicle controller is also provided, which includes the above-described monitoring device for determination of a gear-stick position.

Accordingly, in accordance with an embodiment of the present application, a vehicle is also provided, which includes the vehicle controller as described above.

Accordingly, in accordance with an embodiment of the present application, a machine-readable storage medium is also provided, in which, a program is stored, and the program, when being executed, causes the above-described monitoring method for determination of a gear-stick position to be implemented.

Other features and advantages of the present application will be described in detail in the subsequent section of detailed description of the embodiments.

BRIEF DESCRIPTION OF THE DRAWINGS

The drawings forming part of the present application are used to provide a further understanding of the present application, the exemplary embodiments of the present application and the descriptions thereof are used only for illustrating the present application, without constituting any improper limitations of the present application. In the drawings.

DETAILED DESCRIPTION OF THE EMBODIMENTS

It should be noted that, without conflict, the embodiments of the present application and the features of the embodiments may be combined with each other.

Further, in the embodiments of the present application the term "actual gear-stick position" referred to means a target gear-stick position shifted from the current gear-stick position by a driver, the term "acceptable gear-stick position" referred to means a next acceptable gear-stick position that, under the condition of ensuring vehicle safety, can be shifted from the currently executing acceptable gear-stick position, calculated according to the vehicle state, speed, actual gear-stick position and the like. The actual gear-stick position and acceptable gear-stick position described in the embodiments of the present application may include, for example, P gear (parking gear), D gear (drive gear), R gear (reverse gear), N gear (neutral gear) and the like.

The embodiments of the present application refer to the terms "first", "second" and the like for descriptive purposes only, and should not be considered as indicating or implying relative importance or implicitly indicating the number of technical features indicated.

The present application will be described in detail below with reference to the drawings and in conjunction with embodiments.

Figure 1:
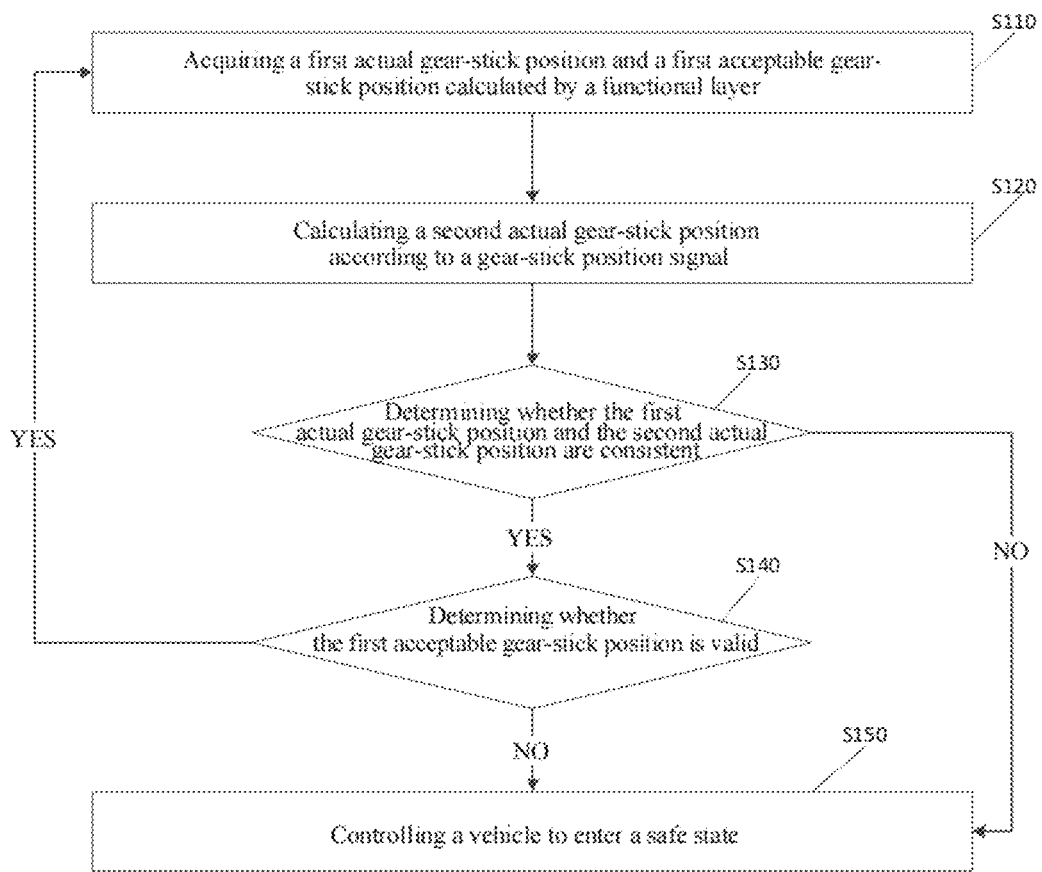
FIG. 1 shows a schematic flow diagram of a monitoring method for determination of a gear-stick position according to an embodiment of the present application.

FIG. 1 shows a schematic flow diagram of a monitoring method for determination of a gear-stick position according to an embodiment of the present application. As shown in FIG. 1, the embodiment of the present application provides a monitoring method for determining the gear-stick position, the method may be performed through a vehicle controller, specifically, through a monitoring layer of the vehicle controller. The monitoring layer may be configured to monitor a functional layer of the vehicle controller, the functional layer is configured to perform the determination of the gear-stick position. The vehicle controller may, for example, be a vehicle controller of a pure electric vehicle. The method may include steps S110 to step S150.

In step S110, a first actual gear-stick position and a first acceptable gear-stick position calculated by the functional layer are acquired.

A sensor may be arranged at a position of the gear stick located to detect the gear-stick position. The electronic shifter of a vehicle can collect a gear-stick position signal detected by the sensor and provide the gear-stick position signal to the vehicle controller through via bus. By providing two sensors at the gear-stick position, two gear-stick position signals are detected, which may be, for example, a positive gear-stick position signal and a negative gear-stick position signal.

When the gear position is shifted by a driver, the two sensors can detect changes in the gear-stick position, and generate a positive gear-stick position signal and a negative gear-stick position signal, the positive and negative gear-stick position signals can be transmitted to the electronic shifter, and through the electronic shifter, the positive and negative gear-stick position signals can be provided to the vehicle controller via the bus. The functional layer of the vehicle controller can calculate the first actual gear-stick position according to the positive and negative gear-stick position signals.

Further, the functional layer may also calculate the first acceptable gear-stick position according to a vehicle state, a current speed and the calculated first actual gear-stick position. Specifically, the functional layer may be configured to determine whether the conditions for shifting from the acceptable gear-stick position currently being executed to the first acceptable gear-stick position are satisfied, if satisfied, the first acceptable gear-stick position may be determined to be the first actual gear-stick position, if not satisfied, the first acceptable gear-stick position is determined to be the acceptable gear-stick position currently being executed. By way of example, in case that the vehicle is in N gear, if the driver operates the gear stick to shift the gear-stick position, for example, from N gear to D gear, where the condition for shifting from N gear to D gear is that the brake pedal is depressed, the functional layer, in the absence of logic failures, may be configured to calculate the first actual gear-stick position D gear. The functional layer may also be configured to determine whether the conditions for shifting from the currently executing acceptable gear-stick position N gear to the first actual gear-stick position D gear are met, i.e., whether the brake pedal has been stepped on. If the brake pedal is depressed, the conditions for shifting from the currently executing acceptable gear-stick position N gear to the first actual gear-stick position D gear may be determined to be met, and then the first acceptable gear-stick position may be determined to be D gear, otherwise, the first acceptable gear-stick position may be determined to be N gear.

In step S120, a second actual gear-stick position is calculated based on a gear-stick position signal.

When the functional layer is configured to calculate the first actual gear-stick position according to the gear-stick position signal, the monitoring layer may also be configured to calculate the second actual gear-stick position accordingly according to the gear-stick position signal.

As described above, the gear-stick position signal may include two gear-stick position signals, i.e., the positive gear-stick position signal and the negative gear-stick position signal. The monitoring layer may be configured to first determine whether the positive and negative gear-stick position signals are consistent. For example, a gear-stick position may be calculated according to the positive gear-stick position signal, a gear-stick position may be calculated according to the negative gear-stick position signal, and if the calculated two gear-stick positions are consistent, then the positive gear-stick position signal and the negative gear-stick position signal are consistent. Otherwise, it may be considered that the positive gear-stick position signal and the negative gear-stick position signal are inconsistent, and if the positive gear-stick position signal and the negative gear-stick position signal are inconsistent, the vehicle may be controlled to enter a safe state.

If the monitoring layer determines that the positive gear-stick position signal and the negative gear-stick position signal are consistent, the actual gear-stick position determined according to either gear-stick position signal is determined as the second actual gear-stick position.

In step S130, it is determined whether the first actual gear-stick position and the second actual gear-stick position are consistent.

In step S140, it is determined whether the first acceptable gear-stick position is valid, in case that the first actual gear-stick position and the second actual gear-stick position are consistent.

The first actual gear-stick position and the second actual gear-stick position are consistent, indicating that the logic of the functional layer for calculating the actual gear-stick position is faultless, and can continue to judge whether the first acceptable gear-stick position determined by the functional layer is valid. In case that a logical failure is existed in the logic of the functional layer for calculating the actual gear-stick position, the first actual gear-stick position and the second actual gear-stick position will be inconsistent.

In case that the first actual gear-stick position and the first acceptable gear-stick position are consistent, the monitoring layer may be configured to determine whether the acceptable gear-stick position currently being executed can be shifted to the first acceptable gear-stick position, i.e., to determine, according to the vehicle state and/or the current speed and the like, whether the condition for shifting are satisfied. If it is determined that the acceptable gear-stick position currently being executed cannot be shifted to the first acceptable gear-stick position, then the first acceptable gear-stick position may be determined to be invalid. If it is determined that the acceptable gear-stick position currently being executed can be shifted to the first acceptable gear-stick position, then the first acceptable gear-stick position may be determined to be valid.

In case that the first actual gear-stick position and the first acceptable gear-stick position are inconsistent, the monitoring layer may be configured to determine whether the acceptable gear-stick position currently being executed can be shifted to the first actual gear-stick position, that is, to determine, according to the vehicle state and/or the current speed and the like, whether the condition for shifting are satisfied. If it is determined that the acceptable gear-stick position currently being executed can be shifted to the first actual gear-stick position, then the first acceptable gear-stick position may be determined to be invalid. If it is determined that the acceptable gear-stick position currently being executed cannot be shifted to the first actual gear-stick position, then the first acceptable gear-stick position may be determined to be valid.

By way of example, in case that the vehicle is in N gear, if the driver operates the gear-stick to shift the gear-stick position, for example, from N gear to D gear. It is understood that, in this example, the acceptable gear-stick position currently being executed is N gear, and the actual gear-stick position is D gear.

Assuming that the logic of functional layer is faultless, the first actual gear-stick position calculated by the functional layer is D gear. Because when shifting from N gear to D gear, the operation needs to be performed at the same time is to press the brake pedal. The functional layer correspondingly detects whether the brake pedal is stepped on, if the brake pedal is depressed, the functional layer may determine that the gear-stick position can be shifted from N gear to D gear at present, and calculate the first acceptable gear-stick position as D gear. If the functional layer detects that the brake pedal has not been stepped on, then it is determined that the gear-stick position cannot be shifted from N gear to D gear at present, and then the acceptable gear-stick position N gear currently being executed is determined as the first acceptable gear-stick position.

In one case, further assuming that the brake pedal is not stepped on when the driver shifts the gear-stick position from N gear to D gear. Due to the logic failure of the functional layer, the calculated first actual gear-stick position is D gear, and the calculated first acceptable gear-stick position is D gear. The monitoring layer first calculates the second actual gear-stick position D gear, and determines that the first actual gear-stick position and the second actual gear-stick position are consistent. The monitoring layer then calculates whether the first acceptable gear-stick position is valid. Because the first actual gear-stick position and the first acceptable gear-stick position are consistent, so the execution condition for the monitoring layer to first determine that the currently executing acceptable gear-stick position N gear is shifted to the first acceptable gear-stick position D gear is that the brake pedal is depressed, then the monitoring layer monitors whether the brake pedal is depressed. As previously assumed, the driver does not step on the brake pedal, then the monitoring layer can determine that the currently executing acceptable gear-stick position N gear cannot be shifted to the first acceptable gear-stick position D gear, it thus can be determined that the first acceptable gear-stick position is invalid.

In one case, further assuming that the brake pedal is depressed when the driver shifts the gear-stick position from N gear to D gear. Due to the logic failure of the functional layer, the calculated first actual gear-stick position is D gear, and the calculated first acceptable gear-stick position is N gear. The monitoring layer first calculates the second actual gear-stick position D gear, and determines that the first actual gear-stick position and the second actual gear-stick position are consistent. The monitoring layer then calculates whether the first acceptable gear-stick position is valid. Because the first actual gear-stick position and the first acceptable gear-stick position are inconsistent, so the execution condition for the monitoring layer to first determine that the currently executing acceptable gear-stick position N gear is shifted to the first actual gear-stick position D gear is that the brake pedal is depressed, then the monitoring layer monitors whether the brake pedal is depressed. As previously assumed, the brake pedal is depressed, then the monitoring layer can determine that the currently executing acceptable gear-stick position N gear can be shifted to the first acceptable gear-stick position D gear, that is, the first acceptable gear-stick position should be D gear, and the first acceptable gear-stick position determined by the monitoring layer is N gear, therefore, it thus can be determined that the first acceptable gear-stick position is invalid.

The above are examples of shifting from N gear to D gear, it should be understood that embodiments of the present application may be applied for shifting between any gears. For example, the condition for shifting from D gear to R gear may be that the speed cannot exceed a preset value, and the monitoring layer may be configured to monitor whether the first acceptable gear-stick position calculated by the functional layer is valid according to this condition.

In step S150, the vehicle is controlled to enter a safe state in case that the first actual gear-stick position and the second actual gear-stick position are inconsistent or the first acceptable gear-stick position is invalid.

If the monitoring layer determines that the first acceptable gear-stick position is valid, then continue to acquire the first actual gear-stick position and the first acceptable gear-stick position calculated by the functional layer next time without interfering with the execution of the functional layer.

If the monitoring layer determines that the first actual gear-stick position and the second actual gear-stick position are inconsistent, or determines that the first acceptable gear-stick position is invalid, or as described above, the monitoring layer determines that the positive gear-stick position signal and the negative gear-stick position signal are inconsistent, that is, the monitoring layer determines that the functional layer has logic failure, then the monitoring layer can control the vehicle to enter the safe state to ensure safe driving of the whole vehicle.

In another embodiment of the present application, the vehicle may be controlled according to the current speed of the vehicle to enter the safe state. The current speed of the vehicle can be obtained by bus. The monitoring layer may be configured to determine whether the current speed of the vehicle is greater than a first threshold. The first threshold can be set to any appropriate value based on the actual situation.

If the current speed is greater than the first threshold, indicating that the speed is faster, then the gear position should not be directly set to neutral gear, and the vehicle may be controlled to remain driving at the acceptable gear-stick position currently being executed. For example, the currently executing acceptable gear position is D gear, the driver's target gear position is R gear, and the current speed is greater than the first threshold. If the monitoring layer determines that the functional layer has logic failure, and the vehicle needs to be controlled to enter the safe state, then the vehicle can be controlled to remain driving in D gear. In case that the vehicle is controlled to remain driving at the acceptable gear-stick position currently being executed, the functional layer may also set a limit torque for the acceptable gear-stick position currently being executed to control the vehicle to reduce the speed. It will be appreciated that the limit torque corresponding to different gears may be the same or different, or the limit torque is less than the requested torque of the gear in the case of no fault, for example, the limit torque may be half of the requested torque of the gear under normal circumstances.

If the current speed is less than the first threshold, which means the speed is relatively low and the gear position can be set directly to the neutral gear (e.g., N gear) to slow down the vehicle to a standstill.

In some alternative embodiments, after the vehicle is controlled to enter the safe state, the vehicle controller may also issue a prompt about the vehicle failure, for example, the prompt may eventually be presented to the driver in a form that is observable by the driver, in order to facilitate the driver to repair the vehicle and the like.

By the monitoring method for determination of a gear-stick position provided by the embodiments of the present application, the logic processing results of the functional layer of the vehicle controller are monitored, and in the case of functional layer failure, the vehicle is controlled to enter the safe state, thereby ensuring the safety of the whole vehicle.

Figure 2:
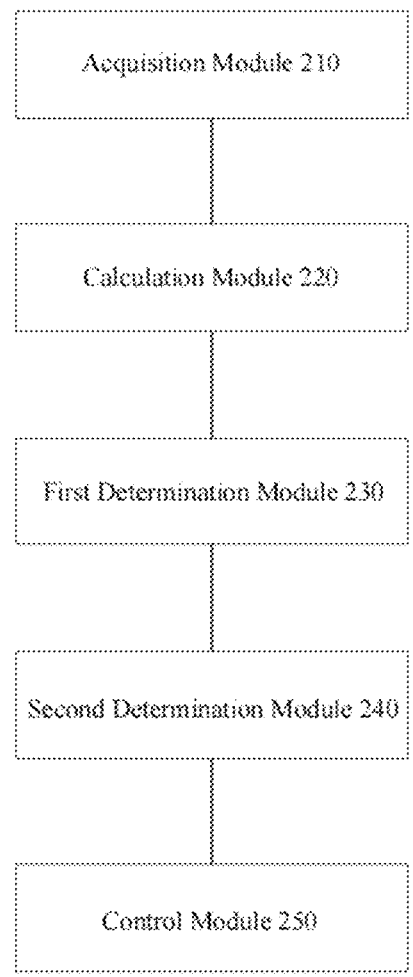
FIG. 2 shows a block diagram of a monitoring device for determination of a gear-stick position according to an embodiment of the present application.

FIG. 2 shows a block diagram of a monitoring device for determination of a gear-stick position according to an embodiment of the present application. As shown in FIG. 2, the embodiment of the present application also provides a monitoring device for determination of a gear-stick position, the device may be disposed on a vehicle controller, for example, may form the monitoring layer of the vehicle controller. The monitoring layer may be configured to monitor the functional layer of the vehicle controller. The vehicle controller may, for example, be a vehicle controller of a pure electric vehicle. The device may include: an acquisition module 210, a calculation module 220, a first determination module 230, a second determination module 240, and a control module 250. The acquisition module 210 is configured for obtaining a first actual gear-stick position and a first acceptable gear-stick position calculated by a functional layer. The calculation module 220 is configured for calculating a second actual gear-stick position according to a gear-stick position signal. The first determination module 230 is configured for determining whether the first actual gear-stick position and the second actual gear-stick position are consistent. The second determination module 240 is configured for determining whether the first acceptable gear-stick position is valid in case that the first actual gear-stick position and the second actual gear-stick position are consistent. The control module 250 is configured for controlling a vehicle to enter a safe state in case that the first actual gear-stick position and the second actual gear-stick position are inconsistent or the first acceptable gear-stick position is invalid. The monitoring device for determination of a gear-stick position provided by the embodiments of the present application can monitor the logic processing results of the functional layer, and control, in the case of functional layer failure, the vehicle to enter the safe state, thereby ensuring the safety of the whole vehicle.

In some alternative embodiments, the control module is configured to control the vehicle to enter a safe state according to the following operations that include: determining whether a current speed of the vehicle is greater than a first threshold; in case that the current speed of the vehicle is greater than the first threshold, controlling the vehicle to remain driving at the acceptable gear-stick position currently being executed, and setting a limit torque for the acceptable gear-stick position currently being executed; and in case that the current speed is smaller than or equal to the first threshold, controlling the vehicle to travel in neutral gear.

In some alternative embodiments, the gear-stick position signal may include a positive gear-stick position signal and a negative gear-stick position signal, the calculation module may be configured to calculate the second actual gear-stick position according to the following operations that include: determining whether the positive gear-stick position signal and the negative gear-stick position signal are consistent; and calculating the second actual gear-stick position in case that the positive gear-stick position signal and the negative gear-stick position signal are consistent. Optionally, in case that the positive gear-stick position signal and the negative gear-stick position signal are inconsistent, the control module may be configured to control the vehicle to enter the safe state, so as to ensure the safe driving of the whole vehicle.

In some alternative embodiments, the second determination module may be configured to determine, in case that the first actual gear-stick position and the first acceptable gear-stick position are consistent, whether the acceptable gear-stick position currently being executed can be shifted to the first acceptable gear-stick position. In case of determining that the acceptable gear-stick position currently being executed cannot be shifted to the first acceptable gear-stick position, then it is determined that the first acceptable gear-stick position is invalid. In case of determining that the acceptable gear-stick position currently being executed can be shifted to the first acceptable gear-stick position, then it is determined that the first acceptable gear-stick position is valid. If the first acceptable gear-stick position is determined to be valid, no interfere will be applied to the execution of the functional layer, and if the first acceptable gear-stick position is determined to be invalid, indicating that the functional layer is faulty, then the vehicle may be controlled to enter the safe state to ensure the safe driving of the whole vehicle.

In some alternative embodiments, the second determination module may be configured to determine, in case that the first actual gear-stick position and the first acceptable gear-stick position are inconsistent, whether the acceptable gear-stick position currently being executed can be shifted to the first actual gear-stick position. In case of determining that the acceptable gear-stick position currently being executed cannot be shifted to the first actual gear-stick position, then it is determined that the first acceptable gear-stick position is invalid. In case of determining that the acceptable gear-stick position currently being executed can be shifted to the first actual gear-stick position, then it is determined that the first acceptable gear-stick position is valid. If the first acceptable gear-stick position is determined to be valid, no interfere will be applied to the execution of the functional layer, and if the first acceptable gear-stick position is determined to be invalid, indicating that the functional layer is faulty, then the vehicle may be controlled to enter the safe state to ensure the safe driving of the whole vehicle.

The specific working principle and benefits of the monitoring device for determination of a gear-stick position may be the same as that of the monitoring method for determination of the gear-stick position provided by the embodiments of the present application, which will not be repeated herein.

Accordingly, in accordance with an embodiment of the present application, a vehicle controller is also provided, the vehicle controller may include the monitoring device for determination of a gear-stick position according to any embodiment of the present application.

Accordingly, in accordance with an embodiment of the present application, a vehicle is also provided, the vehicle may include the vehicle controller as described in an embodiment of the present application, the vehicle may be, for example, a pure electric vehicle and the like.

Accordingly, embodiments of the present application further provide a machine-readable storage medium, in which a program is stored, the program, when being executed, causes the monitoring method for determination of a gear-stick position according to any embodiment of the present application to be implemented. The machine-readable storage medium includes, but is not limited to, phase change memory (PRAM), static random access memory (SRAM), dynamic random access memory (DRAM), other types of random access memory (RAM), read-only memory (ROM), electrically erasable programmable read-only memory (EEPROM), flash memory (Flash Memory) or other memory technologies, read-only optical disc read-only memory (CD-ROM), digital multifunction optical disk (DVD) or other optical storage, magnetic cartridges, magnetic disk storage, or other magnetic storage devices, and a variety of media that can store program code.

The above descriptions are merely preferred embodiments of the present application, and are not intended to limit the present application. Any modifications, equivalent substitutions, improvements, etc., made within the spirit and principle of the present application shall be included within the protection scope of the present application.

What is claimed is:

1. A monitoring method for determination of a gear-stick position, comprising:
   acquiring a first actual gear-stick position and a first acceptable gear-stick position calculated by a functional layer;
   calculating a second actual gear-stick position according to a gear-stick position signal;
   determining whether the first actual gear-stick position and the second actual gear-stick position are consistent;
   determining whether the first acceptable gear-stick position is valid in case that the first actual gear-stick position and the second actual gear-stick position are consistent; and
   controlling a vehicle to enter a safe state in case that the first actual gear-stick position and the second actual gear-stick position are inconsistent, or the first acceptable gear-stick position is invalid.

2. The monitoring method for determination of the gear-stick position according to claim 1, wherein said controlling the vehicle to enter the safe state comprising:
   determining whether a current speed of the vehicle is greater than a first threshold;
   controlling the vehicle to remain driving at an acceptable gear-stick position currently being executed, and setting a limit torque for the acceptable gear-stick position currently being executed in case that the current speed is greater than the first threshold; and
   controlling the vehicle to travel in a neutral gear in case that the current speed is smaller than or equal to the first threshold.

3. The monitoring method for determination of the gear-stick position according to claim 1, wherein
   the gear-stick position signal comprises a positive gear-stick position signal and a negative gear-stick position signal;
   said calculating the second actual gear-stick position according to the gear-stick position signal comprises:
      determining whether the positive gear-stick position signal and the negative gear-stick position signal are consistent; and
      calculating the second actual gear-stick position in case that the positive gear-stick position signal and the negative gear-stick position signal are consistent; and
   the monitoring method for determination of the gear-stick position further comprises:
      controlling the vehicle to enter the safe state in case that the positive gear-stick position signal and the negative gear-stick position signal are inconsistent.

4. The monitoring method for determination of the gear-stick position according to claim 1, wherein said determining whether the first acceptable gear-stick position is valid comprises:
   in case that the first actual gear-stick position and the first acceptable gear-stick position are consistent, performing the following steps:
      determining whether an acceptable gear-stick position currently being executed can be shifted to the first acceptable gear-stick position; and
      in case of determining that the acceptable gear-stick position currently being executed cannot be shifted to the first acceptable gear-stick position, then it is determined that the first acceptable gear-stick position is invalid;
   in case that the first actual gear-stick position and the first acceptable gear-stick position are inconsistent, performing the following steps:
      determining whether the acceptable gear-stick position currently being executed can be shifted to the first actual gear-stick position; and
      in case of determining that the acceptable gear-stick position currently being executed can be shifted to the first actual gear-stick position, then it is determined that the first acceptable gear-stick position is invalid.

5. A vehicle controller, comprising a monitoring device for determination of a gear-stick position, and the monitoring device for determination of the gear-stick position comprising:
   an acquisition module, configured to acquire a first actual gear-stick position and a first acceptable gear-stick position calculated by a functional layer;
   a calculation module, configured to calculate a second actual gear-stick position according to a gear-stick position signal;
   a first determination module, configured to determine whether the first actual gear-stick position and the second actual gear-stick position are consistent;
   a second determination module, configured to determine, in case that the first actual gear-stick position and the second actual gear-stick position are consistent, whether the first acceptable gear-stick position is valid; and
   a control module, configured to control, in case that the first actual gear-stick position and the second actual gear-stick position are inconsistent, or the first acceptable gear-stick position is invalid, a vehicle to enter a safe state.

6. The vehicle controller according to claim 5, wherein the control module is configured to control the vehicle to enter the safe state according to the following operations that comprise:
   determining whether a current speed of the vehicle is greater than a first threshold;
   controlling the vehicle to remain driving at an acceptable gear-stick position currently being executed, and setting a limit torque for the acceptable gear-stick position currently being executed in case that the current speed is greater than the first threshold; and
   controlling the vehicle to travel in a neutral gear in case that the current speed is lesser than or equal to the first threshold.

7. The vehicle controller according to claim 5, wherein
   the gear-stick position signal comprises a positive gear-stick position signal and a negative gear-stick position signal;

the calculation module is configured to calculate the second actual gear-stick position according to the gear-stick position signal based on the following operations that comprise:
- determining whether the positive gear-stick position signal and the negative gear-stick position signal are consistent; and
- calculating the second actual gear-stick position in case that the positive gear-stick position signal and the negative gear-stick position signal are consistent; and the control module is further configured to control, in case that the positive gear-stick position signal and the negative gear-stick position signal are inconsistent, the vehicle to enter the safe state.

8. The vehicle controller according to claim 5, wherein the second determination module is configured to determine whether the first acceptable gear-stick position is valid according to the following operations that comprise:
- in case that the first actual gear-stick position and the first acceptable gear-stick position are consistent, performing the following operations:
  - determining whether an acceptable gear-stick position currently being executed can be shifted to the first acceptable gear-stick position; and
  - in case of determining that the acceptable gear-stick position currently being executed cannot be shifted to the first acceptable gear-stick position, then it is determined that the first acceptable gear-stick position is invalid;
- in case that the first actual gear-stick position and the first acceptable gear-stick position are inconsistent, performing the following operations:
  - determining whether the acceptable gear-stick position currently being executed can be shifted to the first actual gear-stick position; and
  - in case of determining that the acceptable gear-stick position currently being executed can be shifted to the first actual gear-stick position, then it is determined that the first acceptable gear-stick position is invalid.

9. A non-temporary machine-readable storage medium, storing a program, wherein the program, when being executed, causes the following operations to be performed, that comprise:
- acquiring a first actual gear-stick position and a first acceptable gear-stick position calculated by a functional layer;
- calculating a second actual gear-stick position according to a gear-stick position signal;
- determining whether the first actual gear-stick position and the second actual gear-stick position are consistent;
- determining whether the first acceptable gear-stick position is valid in case that the first actual gear-stick position and the second actual gear-stick position are consistent; and
- controlling a vehicle to enter a safe state in case that the first actual gear-stick position and the second actual gear-stick position are inconsistent, or the first acceptable gear-stick position is invalid.

10. The non-temporary machine-readable storage medium according to claim 9, wherein the operation of controlling the vehicle to enter the safe state further comprises:
- determining whether a current speed of the vehicle is greater than a first threshold;
- controlling the vehicle to remain driving at an acceptable gear-stick position currently being executed, and setting a limit torque for the acceptable gear-stick position currently being executed in case that the current speed is greater than the first threshold; and
- controlling the vehicle to travel in a neutral gear in case that the current speed is smaller than or equal to the first threshold.

11. The non-temporary machine-readable storage medium according to claim 9, wherein
- the gear-stick position signal comprises a positive gear-stick position signal and a negative gear-stick position signal;
- the operation of calculating the second actual gear-stick position according to the gear-stick position signal further comprises:
  - determining whether the positive gear-stick position signal and the negative gear-stick position signal are consistent; and
  - calculating the second actual gear-stick position in case that the positive gear-stick position signal and the negative gear-stick position signal are consistent; and
- wherein the operations further comprise:
  - controlling the vehicle to enter the safe state in case that the positive gear-stick position signal and the negative gear-stick position signal are inconsistent.

12. The non-temporary machine-readable storage medium according to claim 9, wherein the operation of determining whether the first acceptable gear-stick position is valid comprises:
- in case that the first actual gear-stick position and the first acceptable gear-stick position are consistent, performing the following operations:
  - determining whether an acceptable gear-stick position currently being executed can be shifted to the first acceptable gear-stick position; and
  - in case of determining that the acceptable gear-stick position currently being executed cannot be shifted to the first acceptable gear-stick position, then it is determined that the first acceptable gear-stick position is invalid;
- in case that the first actual gear-stick position and the first acceptable gear-stick position are inconsistent, performing the following operations:
  - determining whether the acceptable gear-stick position currently being executed can be shifted to the first actual gear-stick position; and
  - in case of determining that the acceptable gear-stick position currently being executed can be shifted to the first actual gear-stick position, then it is determined that the first acceptable gear-stick position is invalid.

* * * * *